United States Patent

[11] 3,575,076

| [72] | Inventors | Herman J. Baldwin;<br>Phillip F. Stapf, Jr., Cincinnati, Ohio |
|---|---|---|
| [21] | Appl. No. | 757,011 |
| [22] | Filed | Sept. 3, 1968 |
| [45] | Patented | Apr. 13, 1971 |
| [73] | Assignee | Cincinnati Milacron Inc.<br>Cincinnati, Ohio |

[54] HOLD-DOWN APPARATUS FOR MATERIAL-CUTTING MACHINE
17 Claims, 13 Drawing Figs.

[52] U.S. Cl. .................................................. 83/422,
83/155, 83/424, 83/428, 83/925
[51] Int. Cl. .................................................. B26d 5/20
[50] Field of Search .......................................... 83/155,
424, 422, 428, 925 (C.C); 226/190; 198/202;
74/240, 241

[56] References Cited
UNITED STATES PATENTS

| 2,593,158 | 4/1952 | Lorig | 198/202UX |
| 2,665,592 | 1/1954 | Lorig | 74/241 |
| 3,304,820 | 2/1967 | Muller et al. | 83/424X |
| 3,339,818 | 9/1967 | Morrow | 226/190 |
| 3,499,355 | 3/1970 | Wiatt et al. | 83/422X |

*Primary Examiner*—James M. Meister
*Attorney*—Frank C. Leach, Jr.

ABSTRACT: A pair of endless bands is disposed on opposite sides of a transversely moving cutting blade to exert a predetermined downward force on material, which is advanced longitudinally relative to the cutting blade. Each of the endless bands is passed around a pair of rollers, which are rotatably mounted in a housing. The housing is rockably supported to accommodate uneven surfaces of the material while still maintaining contact with the material through a portion of the band so as to exert the predetermined downward force on the material. Each of the housings has means therein to produce a bow in the roller adjacent its central portion whereby the band will track properly.

Patented April 13, 1971

HOLD-DOWN APPARATUS FOR MATERIAL-CUTTING MACHINE

In the copending Pat. application of James G. Wiatt and Edward C. Bruns for "Hold-Down Apparatus For Material-Cutting Machine," Ser. No. 636,968, filed May 8, 1967, now U.S. Pat. No. 3,499,355, and assigned to the same assignee as the assignee of the present application, there is shown an apparatus for exerting a predetermined downward force, which may be varied, on material that is advanced longitudinally relative to a cutting blade. The force is varied in accordance with the type of material, the thickness of the layers of the material, and the total thickness of the material. The present invention is an improvement of the apparatus of the aforesaid Wiatt et al. application.

When cutting material with a cutting machine of the type shown and described in the copending Pat. application of George W. Sederberg for "Material Cutting Machine Having Reciprocating Cutting Blade Adapted To Enter Material Without An Entrance Cut," Ser. No. 726,657, filed May 6, 1968, and assigned to the same assignee as the assignee of the present application, the material is fed to the cutting machine from a support table or the like in most instances. When stacking the material on the support table prior to supplying it to the cutting machine, defects may be observed in one or more of the layers of material at various locations thereon. When this occurs, it is necessary to remove the defective portion of the material. Since the material is a long strip, only the defective portion of the material is removed. Then, one portion is placed over the top of the other portion of the material in an overlapping arrangement. If the material being cut has a length of 20 feet, for example, overlapping portions of different layers may occur at several different spaced longitudinal distances of the material being cut.

This overlapping of the material produces a hump in the total thickness of the material being cut. In certain instances, this hump will be sufficient to prevent the endless band of the holddown apparatus of the aforesaid Wiatt et al. application from maintaining contact with the material due to the hump. Thus, if one of these humps were to occur with the holddown apparatus of the aforesaid Wiatt et al. application, the possibility exists that the secondary endless band of the aforesaid Wiatt et al. application would cease to exert a force on the material on one side of the cutting blade for the time during which the hump was disposed beneath the secondary endless band.

If a large amount of transverse movement of the cutting blade were to occur when humps were under both of the secondary endless bands, the possibility exists that there would be no force exerted on the material by the secondary endless bands of the aforesaid Wiatt et al. application. As a result, the cutting blade might fail to cut the desired true pattern. Of course, for very soft and/or relatively thin material, the possibility exists that this hump would not be of sufficient height to remove the secondary endless band of the aforesaid Wiatt et al. application from contact with the top of the material. However, when the material, which is being cut, is not soft and/or relatively thin such as vinyl, for example, the hump will affect the secondary endless band and prevent it from contacting the material to exert the desired predetermined force thereon. For example, in cutting vinyl with a total thickness of 6 inches, the overlapping of two layers of vinyl could result in a hump of three-fourths inch. This would significantly prevent the secondary endless band of the aforesaid Wiatt et al. application from maintaining the desired predetermined force on the material being cut.

The present invention satisfactorily overcomes the foregoing problem by mounting each of the secondary endless bands, which exert the desired predetermined force on the material to retain the material at the desired position to insure that a true pattern is cut, so that a portion of the secondary endless band remains in contact with the top of the material even when the surface of the material is not even. Thus, each of the secondary endless bands of the present invention is rockably mounted so as to be capable of rocking to insure that a portion of the secondary endless band remains in contact with the top surface of the material even when the top surface of the material is uneven and tends to lift the secondary endless band away from engagement with the top surface of the material. The secondary endless bands, which exert the downward predetermined force on the top surface of the material, must be capable of moving longitudinally with the material. Thus, the secondary endless bands must track in the desired direction. Otherwise, they may cause the material to be shifted so as to not have a true pattern formed therein.

For a band or belt, which is being driven, to have good tracking, the length must be substantially greater than the width. However, because of the relatively short length of the secondary endless bands and the relatively large width of the secondary endless bands due to the width of the material, good tracking is not always obtainable when the secondary endless bands are mounted in the manner shown in the aforesaid Wiatt et al. application.

Thus, the present invention is an improvement of the aforesaid Wiatt et al. application by utilizing a structure in which consistent good tracking is obtainable even though the width of the band is several times greater than the length. The present invention accomplishes this by utilizing means to bow the rollers, which support the endless band, so that a camber arrangement is formed whereby the endless band cannot move from its desired track.

An object of this invention is to provide an apparatus to maintain a predetermined downward force on material, which is being cut, irrespective of the unevenness of the top surface of the material.

Another object of this invention is to provide a unique mounting arrangement for the secondary endless bands that exert a downward force on the material being cut.

Other objects of this invention will be readily perceived from the following description, claims, and drawings.

This invention relates to an apparatus for exerting a predetermined force on material supported on material-supporting means and movable longitudinally and transversely relative to a cutting blade or the like for cutting by the cutting blade. The apparatus includes a pair of means adapted to engage the material and disposed on opposite sides of the cutting blade in the longitudinal direction of relative movement of the material and the cutting blade. Each of the pair of material-engaging means is maintained a fixed longitudinal distance from the cutting blade by suitable means. Means cooperates with the pair of material-engaging means to cause the material-engaging means to exert a predetermined force on the material. Each of the material-engaging is rockably supported by means to cause the material-engaging means to rock when an uneven surface of the material engages the material-engaging means to maintain at least a portion of the material-engaging means in engagement with the material to exert the predetermined force thereon.

This invention also relates to a material-cutting machine having cutting means and means to support the material to be cut by the cutting means. The cutting machine has means to produce relative movement in a longitudinal direction between the material-supporting means the cutting means to move the material on the material-supporting means relative to the cutting means in a longitudinal direction and means to produce relative movement in a transverse direction between the cutting means and the material-supporting means in coordination with the longitudinal relative moving means to move the material on the material-supporting means relative to the cutting means in a transverse direction. Means exerts a predetermined force on the material on the material-supporting means adjacent each side of the cutting means. Each of the exerting means is rockably supported by means to cause the exerting means to rock when an uneven surface of the material engages the exerting means to maintain at least a portion of the exerting means in engagement with the material to exert the predetermined force thereon.

The attached drawings illustrate a preferred embodiment of the invention, in which.

Figure 1:
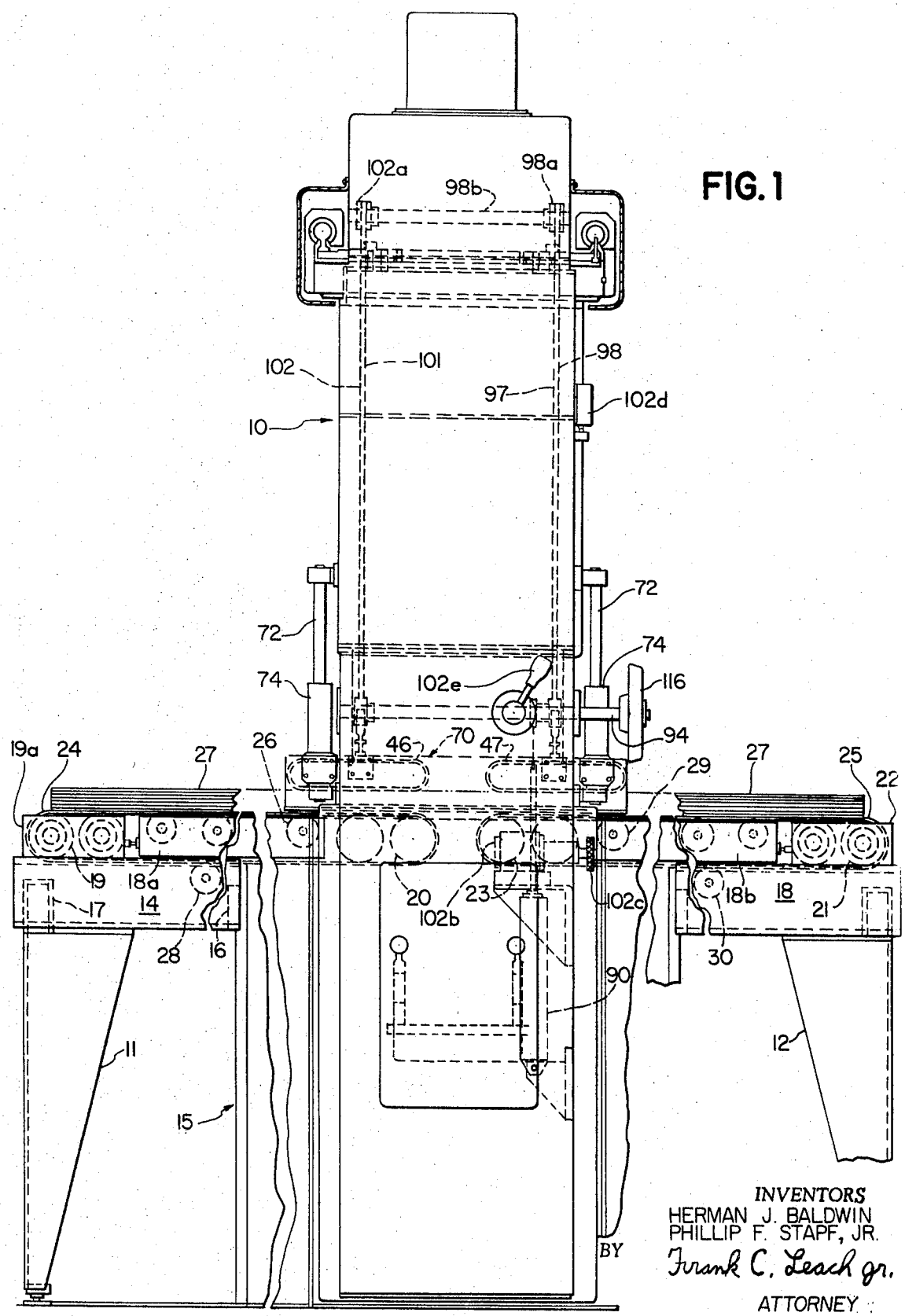
FIG. 1 is a side elevational view of a material-cutting machine utilizing the holddown apparatus of the present invention with parts omitted for clarity purposes.

Referring to the drawings and particularly FIG. 1, there is shown a cutting machine of the type more particularly shown and described in the aforesaid Sederberg application. The cutting machine includes stationary support means such as a bridge 10 having a table structure extending from each side thereof.

The table structure includes upstanding end legs 11 and 12 at opposite ends thereof. Only one of the legs 11 and one of the legs 12 is shown in FIG. 1.

A pair of channels 14 (one shown in FIG. 1) extends from each of the end legs 11 to a boxlike support structure 15, which rests on the floor and supports the bridge 10. The channels 14 rest on a shoulder formed in the boxlike structure 15. As more particularly shown and described in the copending Pat. application of Herman J. Baldwin et al. for "Support Structure for Endless Band," Ser. No. 750,032, filed Aug. 5, 1968, now U.S. Pat. No. 3,519,121, and assigned to the same assignee as the assignee of the present application, the channels 14 are joined to each other by a channel 16, which is fixedly secured to the boxlike structure 15. The legs 11 and the channels 14 are secured to each other by a channel 17.

A similar pair of channels 18 (one shown in FIG. 1 and two shown in FIG. 2) extends from the end legs 12 to the boxlike structure 15. The channels 18 are secured into the boxlike structure 15 in the same manner as the channels 14 and the end legs 11 and the ends of the channels 18 are attached to each other in the same manner as the channels 14 are attached to the legs 11.

The channels 14 are disposed substantially parallel to each other and the channels 18 are disposed substantially parallel to each other. Furthermore, one of the channels 14 is disposed in alignment with one of the channels 18 while the other of the channels 14 is disposed in alignment with the other of the channels 18.

Each of the channels 14 has a bar 18a (one shown in FIG. 1) disposed thereabove. Likewise, each of the channels 18 has a bar 18b (one shown in FIG. 1 and two shown in FIG. 2) disposed thereabove. The bars 18a are disposed parallel to each other and are mounted on the upper surface of the channels 14. The bars 18b are disposed substantially parallel to each other and are mounted on the upper surface of the channels 18. Furthermore, one of the bars 18a is aligned with one of the bars 18b while the other of the bars 18a is aligned with the other of the bars 18b.

As more particularly shown and described in the aforesaid Baldwin et al. application, an end roller 19 is supported between a pair of supports 19a (one shown in FIG. 1) on top of the channels 14 at one end thereof. An end roller 20 is rotatably journaled in the boxlike structure 15 and is disposed in the same plane as the end roller 19.

An end roller 21 is rotatably mounted between a pair of supports 22 (one shown in FIG. 1) on top of the channels 19 in the manner more particularly shown and described in the aforesaid Baldwin et al. application. An end roller 23 is rotatably mounted in the boxlike structure 15 in the manner more particularly shown and described in the aforesaid Baldwin et al. application and is disposed in the same plane as the end roller 21.

A flexible endless band of belt 24 is passed over the end rollers 19 and 20 while a similar flexible endless band or belt 25 is passed over the end rollers 21 and 23.

As more particularly shown and described in the aforesaid Baldwin et al. application, a plurality of horizontally spaced rollers 26 is journaled in the bars 18a and extends therebetween for rotation on stationary axes to provide support to the upper surface of the endless band 24 when it supports material 27 such as a plurality of layers of cloth or vinyl, for example, thereon. A plurality of horizontally spaced rollers 28 is journaled in the channels 14, as more particularly shown and described in the aforesaid Baldwin et al. application, and extends therebetween for rotation on stationary axes to provide support to the lower surface of the endless band 24.

The upper surface of the endless band 25 is supported by a plurality of horizontally spaced rollers 29, which are rotatably supported by the bars 18b and extend therebetween for rotation on stationary axes as more particularly shown and described in the aforesaid Baldwin et al. application. The lower surface of the endless band 25 is supported by a plurality of horizontally spaced rollers 30, which are journaled in the channels 18 and extend therebetween for rotation on stationary axes as more particularly shown and described in the aforesaid Baldwin et al. application.

The end rollers 20 and 23 also function as drive rollers. Thus, rotation of the end rollers 20 and 23 causes the bands 24 and 25 to be driven at the same velocity.

Figure 3:
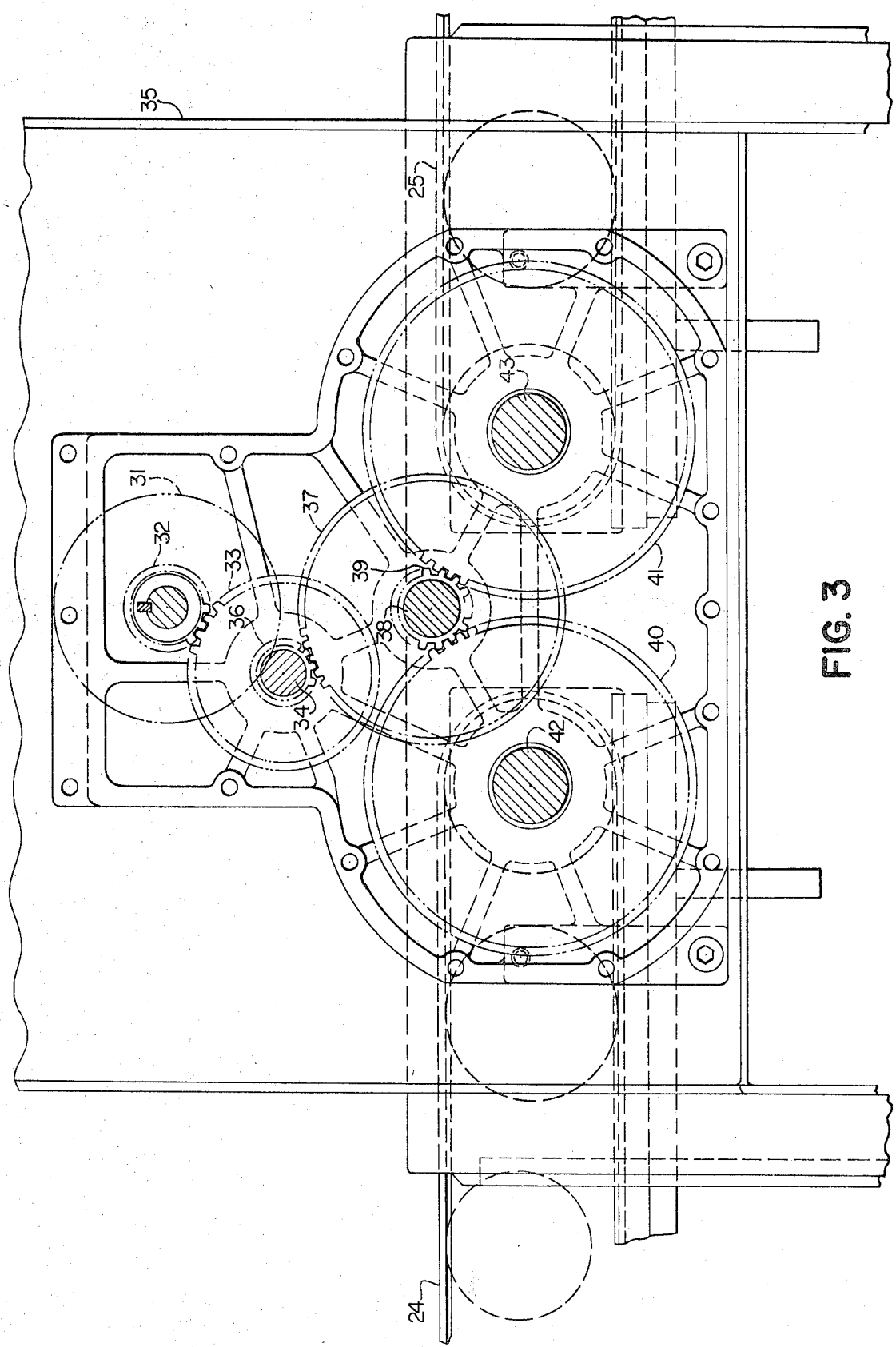
FIG. 3 is an elevational view, partly in section, showing the arrangement for driving the material-supporting bands of the material-cutting machine.

The bands 24 and 25 are driven from a hydraulic motor 31 (see FIG. 3), which is carried by the bridge 10. A gear 32 is disposed on the shaft of the hydraulic motor 31. The gear 32 meshes with a gear 33, which is mounted on a shaft 34 rotatably supported by upright standard 35 of the bridge 10. The shaft 34 has a gear 36 fixedly secured thereto for rotation therewith. The gear 36 meshes with a gear 37, which is mounted on a shaft 38 that also is rotatably mounted within the upright standard 35 of the bridge 10. The shaft 38 has a second gear 39 fixedly secured thereto for rotation therewith.

The gear 39 meshes with a pair of gears 40 and 41. The gear 40 is secured to a shaft 42, which is drivingly connected to the end roller 23, while the gear 41 is secured to a shaft 43, which is drivingly connected to the end roller 20. Accordingly, both of the end rollers 20 and 23 are rotated from a common drive so that the bands or belts 24 and 25 are driven at the same velocity.

Figure 2:
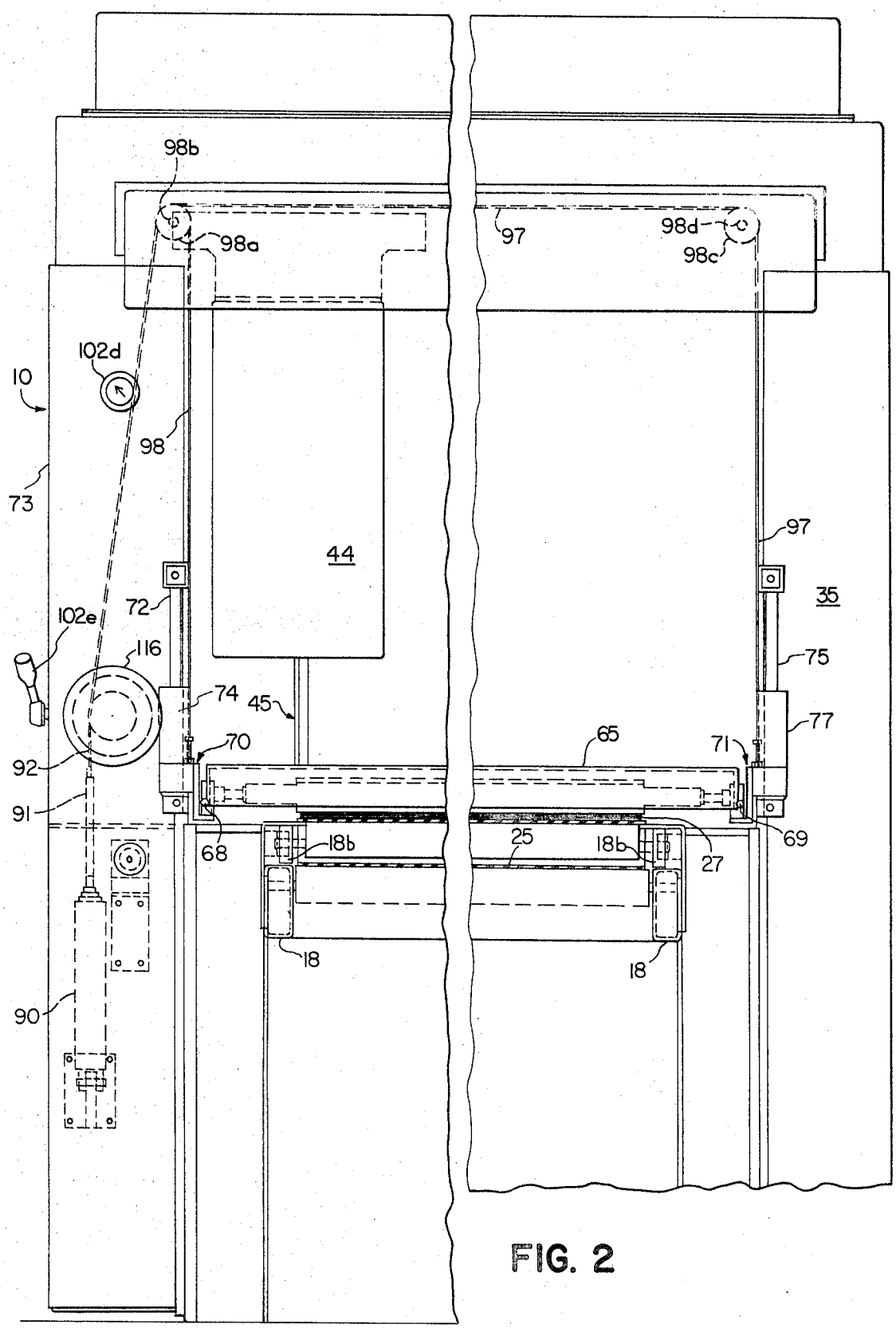
FIG. 2 is an end elevational view of the material-cutting machine of the present invention.

As shown in FIG. 2, the bridge 10 supports a cutting blade support structure 44, which is more particularly shown and described in the aforesaid Sederberg application. As set forth in the aforesaid Sederberg application, the cutting blade support structure 44 supports a cutting blade 45 for reciprocating movement thereon. The cutting blade support structure 44 is movable, transversely of the bridge 10 whereby the cutting blade 45 traverses a transverse passage, which is formed between the spaced endless bands 24 and 25. As described in the aforesaid Sederberg application, the cutting blade 45 is rotatable about a vertical axis.

The width of the transverse passage is substantially closed by suitable means. One suitable structure is shown and described in the aforesaid Sederberg application.

The holddown apparatus includes a pair of secondary, flexible endless bands or belts 46 and 47, (see FIG 1) which are disposed in vertically spaced relation to the endless bands 24 and 25, respectively. Thus, the endless band 46 is disposed on the same side of the cutting blade 45 as the band 24 while the endless band 47 is positioned on the same side of the cutting blade 45 as the endless band 25.

Figure 4:
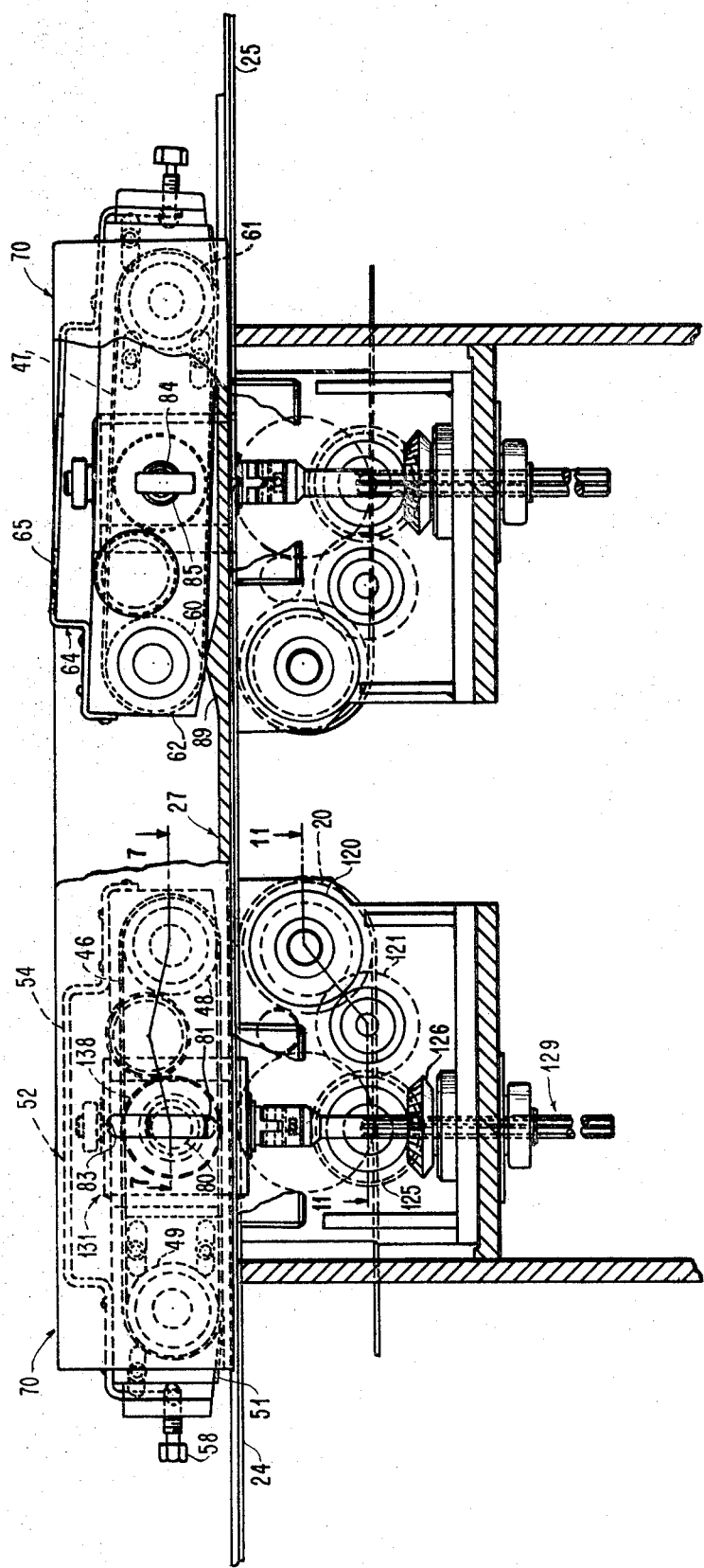
FIG. 4 is a side sectional view, partly in elevation, showing the driving arrangement between the material-supporting bands of the material-cutting machine and the bands of the holddown apparatus of the present invention.

As shown in FIG. 4, the endless band 46 extends around a drive roller 48 and a takeup roller 49. The drive roller 48 is secured to a drive shaft 50 (see FIG. 8), which has one end journaled in a rocking rail 51 of a housing 52 and its other end journaled in a rocking rail 53 (see FIGS. 5 and 8) of the housing 52. The housing 52 includes a cover 54, which has the rocking rails 51 and 53 fixedly secured thereto. Thus, the drive roller 48 is rotatably mounted in the housing 52.

Figure 8:
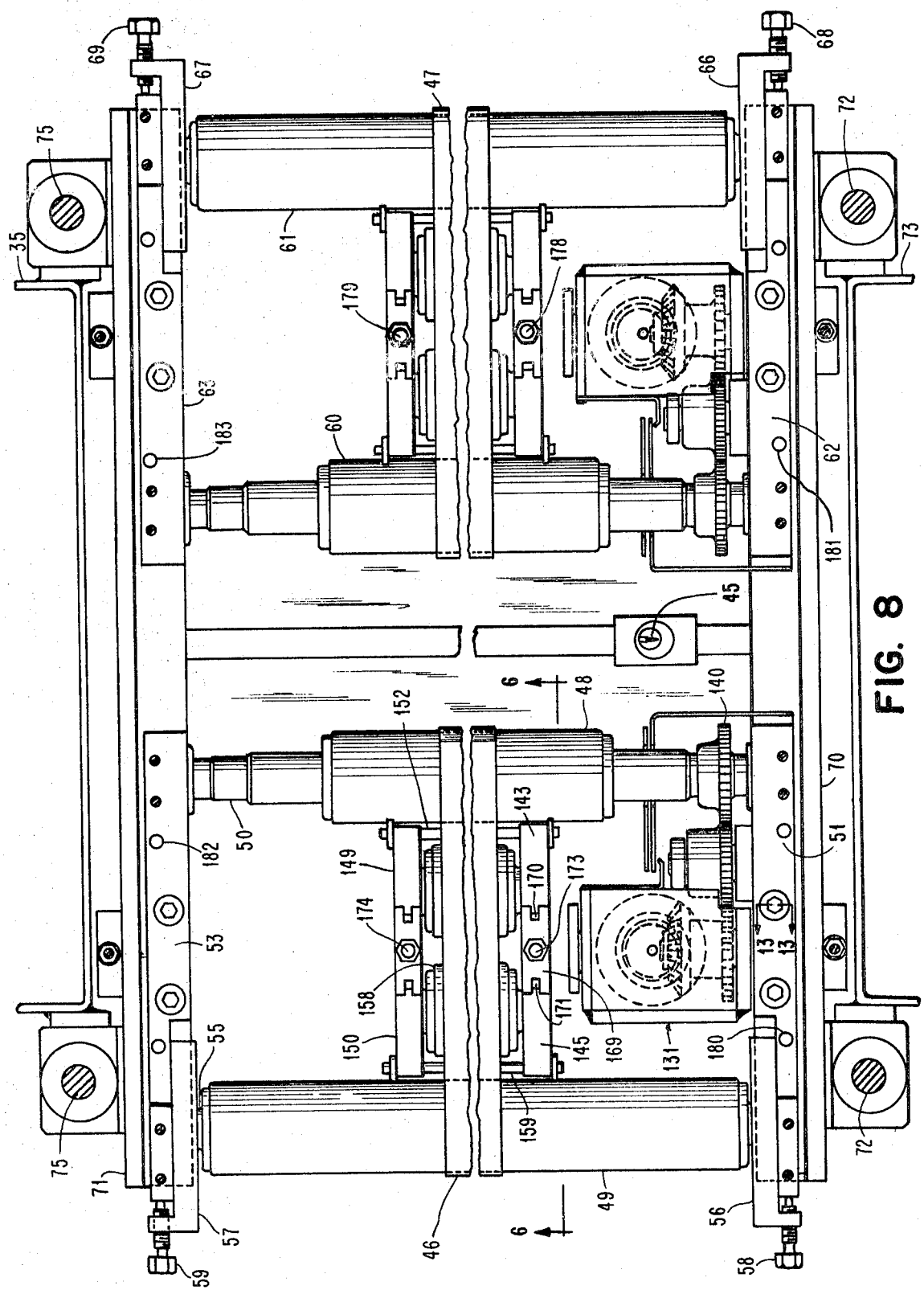
FIG. 8 is a top plan view, partly in section, of the holddown apparatus of the present invention.

The takeup roller 49 is mounted on a shaft 55, which has one end journaled in a bracket 56 and its other end journaled in a bracket 57 (See FIG. 8). The bracket 56 is adjustably movable horizontally with respect to the rocking rail 51 to which it is connected. The adjustment is made by an adjustment screw 58, which moves the bracket 56 relative to the rocking rail 51. Similarly, the bracket 57 is horizontally adjustable with respect to the rocking rail 53 to which it is connected. An adjustment screw 59 is utilized to position the bracket 57 with respect to the rocking rail 53. Thus, both ends of the takeup shaft 55 may be adjusted simultaneously in a horizontal direction to appropriately tighten the belt or band 46.

The endless band 47 extends around a drive roller 60 (see FIG. 4) and a takeup roller 61. The drive roller 60 has the opposite ends of its shaft rotatably journaled in a pair of rocking rails 62 and 63 (see FIG. 8) of a housing 64 in the same manner as the drive roller 48 is mounted on the rocking rails 51 and 53. The housing 64 also has a cover 65 to which the rocking rails 62 and 63 are fixedly secured.

The takeup roller 61 has the opposite ends of its shaft mounted in brackets 66 and 67, which are connected to the rocking rails 62 and 63, respectively, for horizontal movement relative to the housing 64. An adjustment screw 68 horizontally moves the bracket 66 relative to the rocking rail 62 while an adjustment screw 69 horizontally moves the bracket 67 relative to the rocking rail 63.

Accordingly, actuation of the adjustment screws 68 and 69 permits simultaneous adjustment of both of the ends of the shaft for the takeup roller 61. Thus, the takeup roller 61 may be positioned horizontally relative to the drive roller 60 to maintain the endless band 47 taut.

The rocking rail 51 of the housing 52 and the rocking rail 62 of the housing 64 are supported on an L-shaped support 70. The rocking rail 53 of the housing 52 and the rocking rail 63 of the housing 64 are supported on an L-shaped support 71, which is disposed on the opposite side of the endless bands 24 and 25 from the L-shaped support 70.

Figure 13:
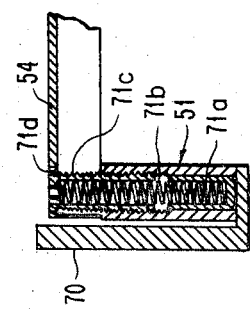
FIG. 13 is a sectional view taken along line 13–13 of FIG. 8 and showing the spring connection between an L-shaped support and a rocking rail of the holddown apparatus of the present invention.

As shown in FIG. 13, the rail 51 is resiliently mounted on the L-shaped support 70. This is accomplished through forming passages through the rail 51 at two different longitudinally spaced positions. Each of the passages has a cap 71a slidably supported therein at the lower end thereof. One end of a spring 71b bears against the cap 71a to urge the spring 71b against the L-shaped support 70 while the other end of the spring 71b bears against a cap 71c, which is threadably mounted in the upper end of the passage formed in the rail 51. The cap 71c extends through an opening 71d in the upper surface of the cover 54 for adjustment of the force of the spring 71b acting on the L-shaped support 70 through the cap 71a. Thus, the rail 51 is resiliently mounted on the L-shaped support 70 with the forces of the springs 71b being variable in accordance with the weight of the material being cut. Similar arrangements exist between the L-shaped support 70 and the rail 62 and between the L-shaped support 71 and the rails 53 and 63.

The spring mounting of the rocking rails on the associated L-shaped supports 70 and 71 results in the mass of the rollers of the secondary endless bands 46 and 47 being taken off of the material 27. Furthermore, the lifting forces of the springs 71b may be adjusted by rotating the caps 71c.

The L-shaped support 70 is slidably supported on a pair of vertically disposed rods 72, which are mounted on an upright standard 73 of the bridge 10. The L-shaped support 70 has a pair of vertically disposed ball bearing bushings 74 (see FIG. 1) secured thereto in horizontally spaced relation to each other. The ball bearing bushings 74 provides the sliding support of the L-shaped support 70 on the rods 72.

The L-shaped support 71 is slidably disposed on a pair of vertically disposed support rods 75, which are supported on the upright standard 35 of the bridge 10. The L-shaped support 71 has a pair of vertically disposed ball bearing bushings 77, which are horizontally spaced from each other for sliding arrangement with the rods 75 to slidably support the L-shaped support 71 on the upright standard 35.

Figure 5:
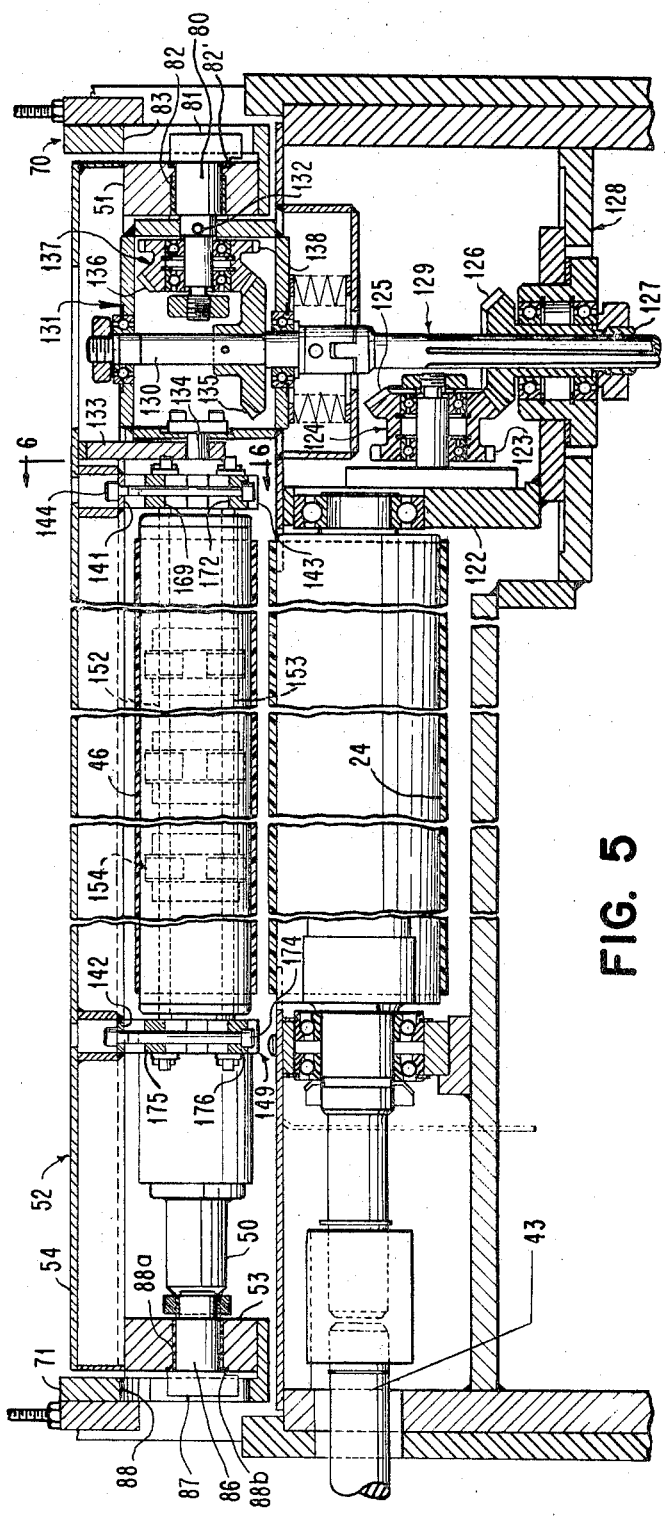
FIG. 5 is a sectional view, partly in elevation, showing the support arrangement for one of the rollers for the band of the holddown apparatus of the present invention and a portion of the arrangement for driving the band of the holddown apparatus.

As shown in FIG. 5, the rail 51 is rotatably mounted about the axis of a shaft 80 having a key-shaped end 81 formed integral therewith and on one end thereof. A Teflon bearing 82 is disposed between the rail 51 and the shaft 80 and a Teflon bearing 82' is positioned between the portions of the end 81 bearing against the side of the rocking rail 51. The end 81 is disposed within a vertically disposed slot 83 (see FIG. 4) in the L-shaped support 70.

With the slot 83 being longer than the key-shaped end 81, the end 81 and the slot 83 cooperate with each other to permit vertical movement of the rocking rail 51 relative to the L-shaped support 70. At the same time, the rocking rail 51 may rotate about the axis of the shaft 80. Thus, the rocking rail 51 is rockably mounted with respect to the L-shaped support 70.

The rocking rail 62 is similarly rotatably mounted on a shaft 84, which has a key-shaped end 85 formed integral therewith and disposed within a vertically disposed slot (not shown) in the L-shaped support 70 of a longer length than the end 85 and of the same length as the slot 83. Thus, the rocking rail 62 is capable of both being moved vertically relative to the L-shaped support 70 and being rotated about the axis of the shaft 84. This results in the rocking rail 62 being rockably mounted on the L-shaped support 70.

As shown in FIG. 5, the rocking rail 53 is rotatably supported on a shaft 86 having a key-shaped end 87 formed integral therewith and disposed within a vertically disposed slot 88, which is similar to the slot 83 in the L-shaped support, 70, in the L-shaped support 71 of longer length than the end 87. A Teflon bearing 88a is disposed between the rocking rail 53 and the shaft 86 and a Teflon bearing 88b is positioned between the portions of the end 87 against which the rocking rail 53 bears. Accordingly, the rocking rail 53 may rotate about the axis of the shaft 86 and be moved vertically relative to the L-shaped support 71. Thus, the rocking rail 53 is rockably supported on the L-shaped support 71.

A similar construction exists for the rocking rail 63. This is, the rocking rail 63 is rotatably mounted on a shaft having a key-shaped end, which is disposed within a vertically disposed slot in the L-shaped support 71 of longer length than the key-shaped end. Thus, the rocking rail 63 may rotate about the axis of its shaft and be moved vertically relative to the L-shaped support 71.

Accordingly, the housing 52 is rockably mounted on the L-shaped supports 70 and 71. One end of the housing 52 is rockably supported on the L-shaped support 70 while the other end is rockably supported on the L-shaped support 71. Similarly, the housing 64 has one end rockably supported on the L-shaped support 70 and its other end rockably supported on the L-shaped support 71.

The housing 64 is shown in a rocking position in FIG. 4 due to a hump 89 in the material 27. The band 47 is still in engagement with the material 27 so as to continue to exert the desired force on the material 27 despite one end of the band 47 being lifted by the hump 89 in the material 27.

With the foregoing arrangements, the endless bands 46 and 47 are supported on the bridge 10 for vertical movement relative to the endless bands 24 and 25. A counterbalance structure is employed to determine the force, which the endless bands 46 and 47 exert on the material 27, since the mass of the bands 46 and 47 and their support structure is much greater than the force, which it is desired to exert upon the material 27 on the endless bands 24 and 25.

The counterbalance structure includes a hydraulic cylinder 90 (see FIG. 2), which is supported on the upright standard 73 of the bridge 10. The cylinder 90 has its piston rod 91 connected to one end of a cable 92, which has its other end fixedly secured to a pulley 93 (see FIG. 9) on a horizontally disposed shaft 94. The shaft 94 is journaled in bearings 95 on the upright standard 73 of the bridge 10 to permit rotation of the shaft 94 and the pulley 93 with respect to the bridge 10.

Figures 6, 9:
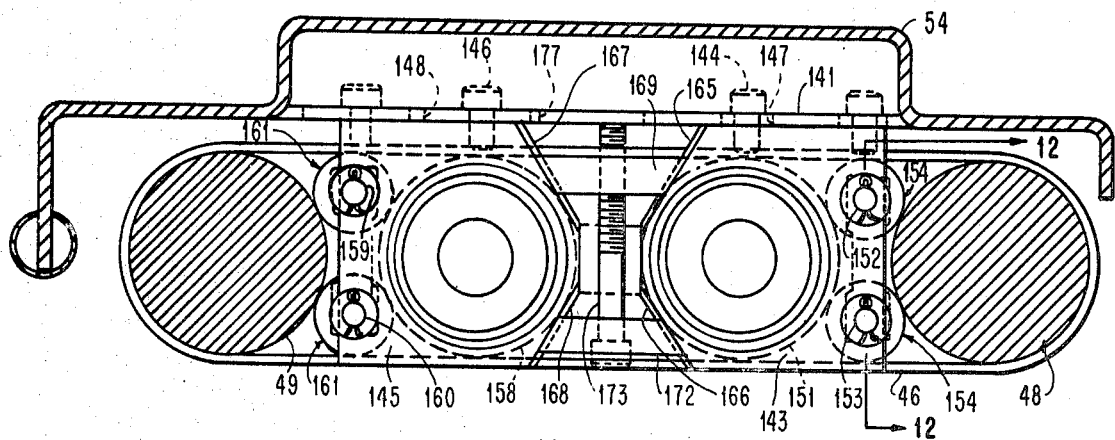
FIG. 6 is an elevational view, partly in section, taken along line 6–6 of FIG. 5 and showing the various rollers for supporting an endless band of the holddown apparatus.
FIG. 9 is a sectional view, partly in elevation, showing a portion of the apparatus for lifting and lowering the holddown apparatus and a safety brake.

The shaft 94 has a second pulley 96 mounted thereon for rotation therewith. As shown in FIG. 9, the pulley 96 is formed integral with the pulley 93.

The pulley 96 has one end of each of a pair of cables 97 and 98 fixedly secured thereto. The other end of the cable 97 is fixedly secured to the L-shaped support 71 after passing over a pulley 98a on a shaft 98b and a pulley 98c on a shaft 98d (see FIG. 2). The shafts 98b and 98d are rotatably mounted on the bridge 10. The other end of the cable 98 is fixedly secured to the L-shaped support 70 after passing over the pulley 98a.

The shaft 94 has a third pulley 100 fixedly secured thereto for rotation therewith. The pulley 100 has one end of each of a pair of cables 101 and 102 fixedly secured thereto. The other end of the cable 101 is fixedly secured to the L-shaped support 71 after passing over a pulley 102a (see FIG. 1), which is mounted on the shaft 98b and a pulley (not shown), which is mounted on the shaft 98d. The other end of the cable 102 is fixedly secured to the L-shaped support 70 after passing over the pulley 102a.

With this arrangement, the L-shaped supports 70 and 71 are supported from the bridge 10. Furthermore, any force exerted on the shaft 94 by the cylinder 90 counterbalances the mass of the L-shaped supports 70 and 71 and the structure supported thereby. Thus, the mass of the endless bands 46 and 47, the housings 52 and 64, and the connected structure must be offset to the desired degree with the force exerted by the cylinder 90.

For example, if the total mass of the structure, which is suspended from the shaft 94, is 300 pounds, and the material 27 requires a force of 20 pounds to be exerted thereon as determined by the type of material, the thickness of each layer of the material, and the total thickness of the material, then the hydraulic cylinder 90 must exert a downward force of 280 pounds on the cable 92. When the hydraulic cylinder 90 produces this force on the cable 92, the endless bands 46 and 47 exert the desired force of 20 pounds on the material 27.

Fluid is admitted to one end of the hydraulic cylinder 90 through a pressure-regulating valve 102b, which is adjusted by a knob 102c. A pressure gauge 102d indicates the pressure within the cylinder 90 whereby the desired force from the cylinder 90 may be obtained through adjusting the valve 102b by the knob 102c.

Figure 10:
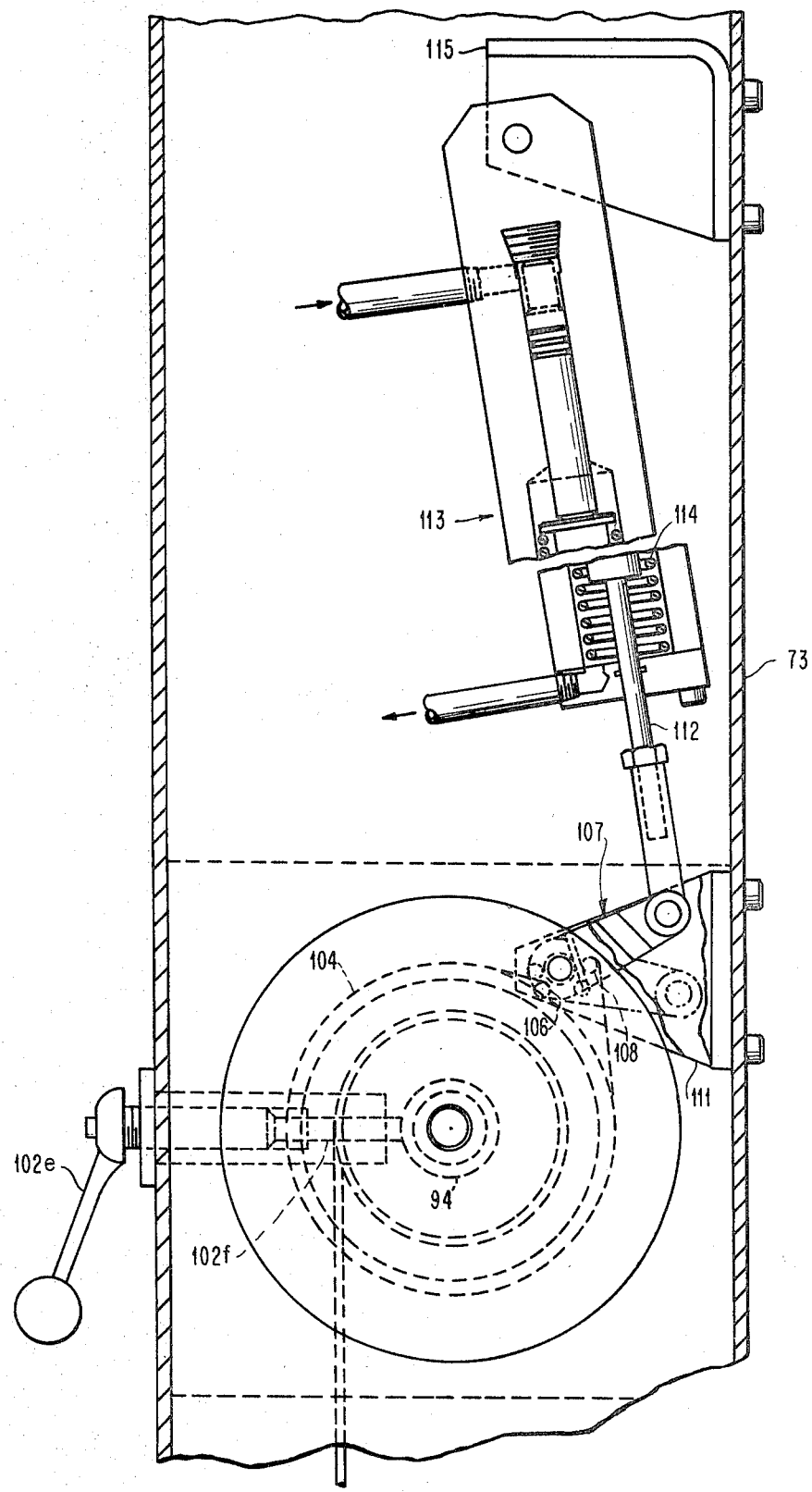
FIG. 10 is a side elevational view, partly in section, of the structure of FIG. 9.

The vertical position of the bottom surface or span of each of the endless bands 46 and 47 at any instant with respect to the top surface or span of the endless bands 24 and 25 at any instant must be such that there is no contact therebetween when there is no material on the endless bands 24 and 25. The endless bands 46 and 47 are retained in the position above the endless bands 24 and 25 through a positioning lock lever 102e (see FIGS. 1, 2, and 10), which has a shoe 102f (see FIG. 10) engaging the shaft 94 to prevent rotation thereof. If the positioning lock lever 102e were not employed, the mass of the endless bands 46 and 47 and their related support structure would cause downward movement thereof since the mass is greater than the force exerted by the hydraulic cylinder 90.

If there should be a power failure, a brake 103 will engage the shaft 94 to prevent rotation thereof even with all of the mass of the holddown apparatus acting thereon since the counterbalancing structure would not be effective because a power failure would remove hydraulic pressure from the cylinder 90. Likewise, when the machine is shut down, the pressure to the cylinder 90 is removed and the brake 103 is effective to prevent the shaft 94 from rotating. Thus, if the shoe 102f of the positioning lock lever 102e had not been tightened against the shaft 94 sufficiently to prevent the shaft 94 from rotating when the entire holddown structure acts on the shaft due to the fluid to the cylinder 90 being released, the brake 103 automatically locks the shaft 94.

The brake 103 includes a band 104, which is wrapped around a drum 105 that is carried by the shaft 94. One end of the band 104 is secured to a first stud 106 (see FIG. 10) on an arm 107 while the other end of the band 104 is secured to a second stud 108 on the arm 107.

One end of the arm 107 is pivotally mounted by a pair of studs 109 (see FIG. 9), which are disposed in legs 110 of a U-shaped member 111. The U-shaped member 111 is carried by the upright standard 73 of the bridge 10.

The other end of the arm 107 is pivotally connected to the bottom end of a piston rod 112 of a hydraulic cylinder 113. A spring 114 in the hydraulic cylinder 113 continuously urges the piston rod 112 upwardly whereby the brake band 104 is urged to its locking position. To unlock the brake band 104 from the drum 105, it is necessary to supply fluid to the hydraulic cylinder 113 to move the piston rod 112 downwardly. Thus, stopping of the fluid supply automatically actuates the brake 103.

The upper end of the hydraulic cylinder 113 is carried by a bracket 115, which is mounted on the upright standard 73 of the bridge 10. Thus, the hydraulic cylinder 113 is pivotally supported by the bridge 10.

In order to control the movement of the endless bands 46 and 47 into engagement with the material 27 of the endless bands 24 and 25 when the positioning lock lever 102e is released to permit rotation of the shaft 94, a end wheel 116 is attached to the shaft 94. The hand wheel 116 permits manual control of the endless bands 46 and 47 until their surfaces engage the material 27.

Likewise, if it should be desired to raise the endless bands 46 and 47 from engagement with the material 27 after cutting of the material 27 has been completed and before the material 27 is removed from the endless bands 24 and 25, the hand wheel 116 is rotated to manually lift the bands 46 and 47. Then, the positioning lock lever 102d is employed to retain the endless bands 46 and 47 in their raised position.

The endless bands 46 and 47 must be driven at the same speed and in the same direction as the endless bands 24 and 25. Accordingly, the velocity of the endless band 46 must be the same as the velocity of the endless band 24, and the velocity of the endless band 47 must be the same as the velocity of the endless band 25. This insures that the endless bands 46 and 47 do not affect the movement of the material 27 by the endless bands 24 and 25.

As previously mentioned, the end rollers 20 and 23 are driven from the hydraulic motor 31. As a result, the endless bands 24 and 25 are driven at the same speed. Furthermore, the end rollers 20 and 23 are rotated in the same direction whereby the endless bands 24 and 25 are advanced longitudinally in the same direction.

The drive roller 48 is driven through suitable gearing from the drive roller 20. Similarly, the drive roller 60 is driven through suitable gearing from the drive roller 23. Accordingly, the endless bands 46 and 47 are driven at the same speed as the endless bands 24 and 25. Additionally, the gearing is so arranged that the drive rollers 48 and 60 rotate in the same direction as the end rollers 20 and 23. Accordingly, the endless bands 46 and 47 are advanced longitudinally in the same direction as the endless bands 24 and 25.

Figure 11:
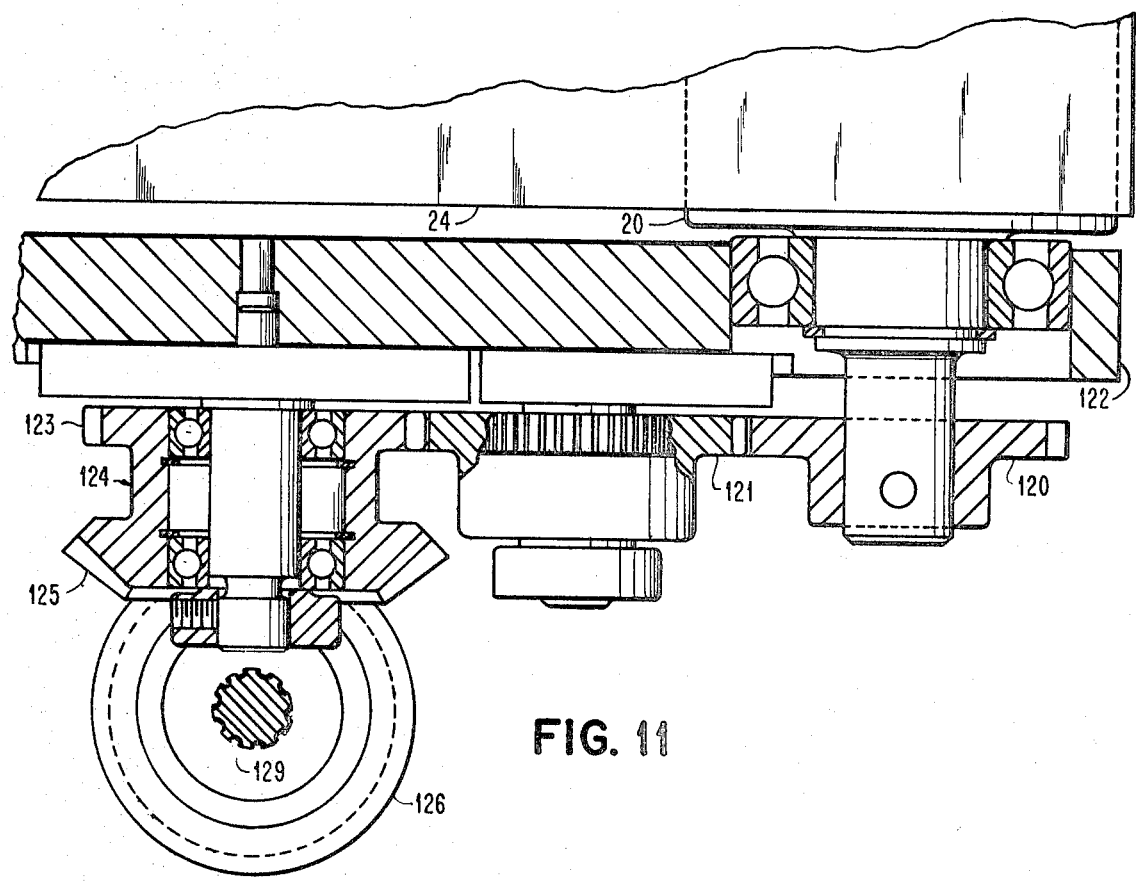
FIG. 11 is a sectional view, partly in plan, taken along line 11–11 of FIG. 4 and showing the gear arrangement from a main drive roller of the material-supporting band for connection to the gear drive for the endless band of the holddown apparatus.

The drive from the end roller 20 to the drive roller 48 includes a gear 120 (see FIG. 11) fixedly secured to one end of the support shaft of the end roller 20. The gear 120 meshes with an idler gear 121, which is rotatably mounted on a sideplate or rail 122 of the boxlike structure resting on the floor and disposed between and secured to the upright standards 35 and 73 of the bridge 10. The idler gear 121 also meshes with a spur gear 123 on a gear member 124, which also is rotatably mounted on the sideplate or rail 122 of the boxlike structure.

The gear member 124 also has a bevel gear 125 thereon for meshing with a bevel gear 126 (see FIG. 5) on a member 127, which is rotatably supported on a horizontal support member 128 of the boxlike structure. The member 127 has a longitudinal passage formed therethrough with splines on the inner surface of the passage for meshing with splines on a splined shaft 129, which is slidably movable in a vertical direction relative to the member 127.

The upper end of the splined shaft 129 is coupled to the lower end of a shaft 130, which is carried by a gear box 131 and rotatably mounted therein. The gear box 131 is supported in the housing 52 for vertical movement therewith but does not rock with the housing 52.

One side of the gear box 131 is fixedly secured by a pin 132 to the shaft 80 for support thereby. The other side of the gear box 131 is supported on a strap 133, which is carried by the cover 54 of the housing 52, by a member 134 that allows the strap 133 to rotate about the axis of a cylindrical portion of the member 134. This is necessary so that the strap 133 may rotate with the housing 52 when the housing 52 rotates. Since the gear box 131 also is fixedly secured to the shaft 80 by the pin 132, any upward movement of the shaft 80 due to the keyshaped end 81 sliding in the slot 83 in the L-shaped support 70 causes the gear box 131 to also move vertically. Accordingly, this mounting arrangement results in the gear box 131 not rotating with the housing 52 but moving vertically therewith. Therefore, when the L-shaped supports 70 and 71 are raised or lowered, the housing 52 moves therewith as does the gear box 131.

Thus, the splined shaft 129 moves vertically with the gear box 131 due to the connection with the shaft 130. However, the splined shaft 129 continues to provide a drive from the member 127 to always rotate the shaft 130 irrespective of the position of the housing 52.

Figure 7:
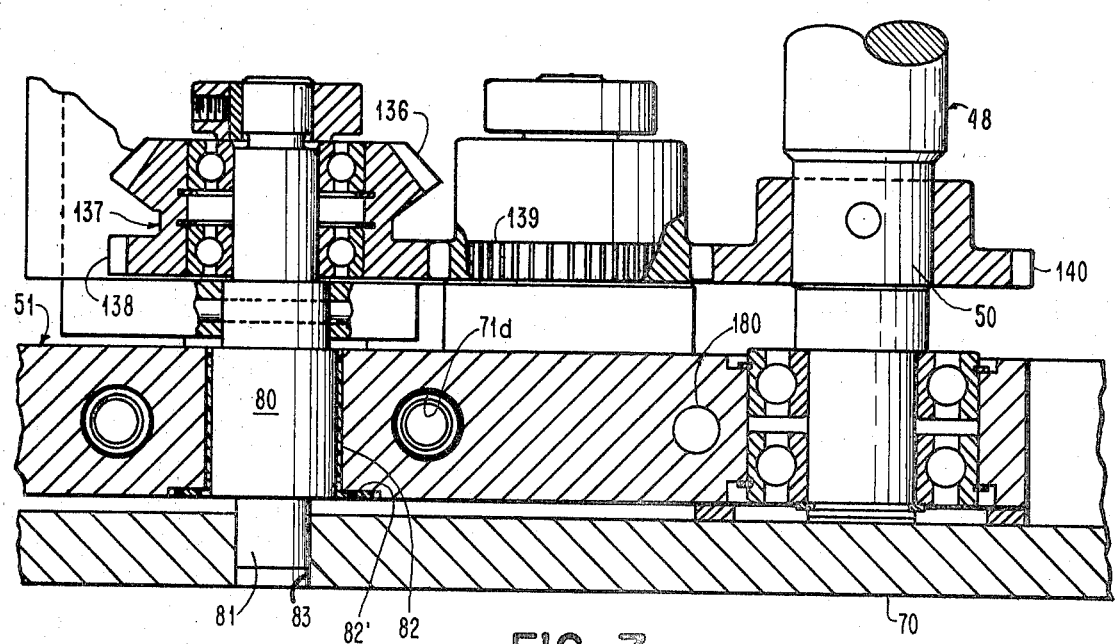
FIG. 7 is a sectional view, partly in plan, taken along line 7–7 of FIG. 4 and showing the gear arrangement for one of the endless bands of the holddown apparatus.

The shaft 130 has a bevel gear 135 fixedly secured thereto for rotation therewith. The bevel gear 135 meshes with a bevel gear 136 on a gear member 137, which is rotatably mounted on the shaft 80. The gear member 137 also has a spur gear 138 thereon that meshes with an idler gear 139 (see FIG. 7). The idler gear 139 is rotatably mounted on the rocking rail 51 so that the gear 139 moves with the rocking rail 51. The idler gear 139 meshes with a gear 140, which is fixed to the shaft 50 of the drive roller 48.

Accordingly, a position drive is provided from the end roller 20 to the drive roller 48. Because of the idler gear 139 being mounted on the rocking rail 51, positive drive is always supplied to the drive roller 48. Thus, the drive roller 48 drives the endless band 46 in the same direction and at the same speed as the endless band 24 is driven by the end roller 20.

A similar arrangement exists to connect the end roller 23 to the drive roller 60. Since the drive is exactly the same, it will not be described in detail. However, it does result in the endless band 47 being driven at the same speed and in the same direction as the endless band 25.

Each of the endless bands 46 and 47 is retained on its drive roller and takeup rollers through forming each of the drive rollers and takeup rollers with a bow or camber. Thus, each of the endless bands 46 and 47 tracks properly even though the width of each of the endless bands 46 and 47 is substantially greater than its length due to the camber.

The cover 54 has a pair of horizontal support plates 141 and 142 (see FIG. 5) disposed in spaced relation thereto and supported thereby. As shown in FIG. 6, the horizontal support plate 141 has a bracket 143 secured thereto by screws 144 and a bracket 145 secured thereto by screws 146.

The screws 144 extend through slots 147 in the plate 141 while the screws 146 extend through slots 148, which are substantially larger than the slots 147, in the plate 141. Thus, when the screws 144 and 146 are released from locking the brackets 143 and 145 to the support plate 141, the brackets 143 and 145 may be moved.

The support plate 142 has a bracket 149 (see FIG. 5), which is the same shape as the bracket 143 and disposed on the opposite side of the endless band 46 therefrom. The bracket 149 is supported on the plate 142 by screws, which are movable in slots of the same size as the slots 147. Thus, the bracket 149 may be moved with the bracket 143.

The support plate 142 also supports a bracket 150 (see FIG. 8) which is the same shape as the bracket 145, by screws disposed in slots in the support plate 142 of the same size as the slots 148 in the support plate 141. Accordingly, the bracket 150 may be moved with the bracket 145 and is movable relative to the bracket 149.

The brackets 143 and 149 have a roller 151 rotatably supported hereon and adapted to engage both the upper and lower spans of the endless band 46 between the drive roller 48 and the takeup roller 49. The roller 151 is mounted in spaced relation to the drive roller 48 as shown in FIG. 6.

The brackets 143 and 149 have a pair of rods 152 and 153 secured thereto and extending therebetween. The axes of the rods 152 and 153 are disposed substantially parallel to the axis of the roller 151 and the axis of the drive roller 48.

The rods 152 and 153 have a plurality of roller units 154 (see FIG. 5) extending therebetween and secured thereto. The roller units 154 are disposed only adjacent the center portion of the rods 152 and 153.

Figure 12:
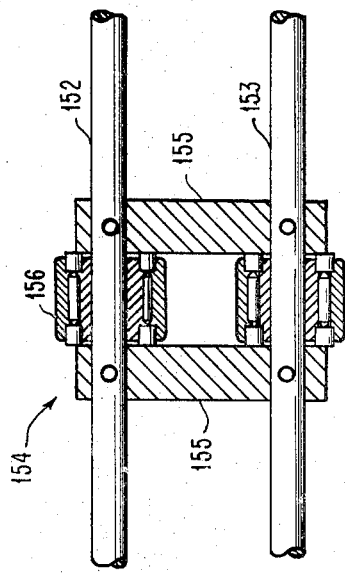
FIG. 12 is a sectional view taken along line 12–12 of FIG. 6 and showing a roller unit for use with the holddown apparatus of the present invention.

Each of the roller units 154 includes a pair of parallel retainers 155 (see FIG. 12) fixedly secured to the rods 152 and 153. The retainers 155 retain a roller 156 therebetween on the rod 152 and a roller 157 therebetween on the rod 153.

The brackets 145 and 150 have a similar arrangement to that of the brackets 143 and 149. That is, a roller 158 (see FIG. 6) is rotatably supported between the brackets 145 and 150 and adapted to provide support to a portion of the upper and lower spans of the endless band 46.

The brackets 145 and 150 also have rods 159 and 160, which are similar to the rods 152 and 153, fixedly secured thereto with roller units 161, which are the same as the roller units 154, mounted thereon. The roller units 161 are positioned only in the center portion of the rods 159 and 160 in the same manner as shown for the roller units 154 in FIG. 5.

As shown in FIG. 6, the roller units 154 are adapted to engage both the drive roller 48 and the roller 151. Likewise, the roller units 161 are adapted to engage both the roller 158 and the takeup roller 49.

The bracket 143 has an upper guide 165 and a lower guide 166 protruding therefrom toward the bracket 145. The bracket 145 has an upper guide 167 and a lower guide 168 protruding therefrom toward the bracket 143. An upper wedge 169 is disposed between the brackets 143 and 145 and has a slot 170 (see FIG. 8) therein on one side to accommodate the upper guide 165 on the bracket 143 and a slot 171 on the other side to accommodate the upper guide 167 on the bracket 145.

A lower wedge 172 (see FIGS. 5 and 6) is disposed between the lower portions of the brackets 143 and 145. The wedge 172 has slots to accommodate the lower guides 166 and 168 in the same manner as the wedge 169 has the slots 170 and 171.

A screw 173 (see FIG. 6) has the upper wedge 169 and the lower wedge 172 threadedly connected thereto. When the screw 173 is turned in one direction, the wedge 172 moves upwardly and tends to move the brackets 143 and 145 apart. As the screw 173 moves upwardly through the wedge 169, the wedge 169 moves downwardly.

Since the takeup roller 49 is adjustably positioned to appropriately tighten the belt through movement of the adjustment screws 58 and 59 (see FIG. 8), the wedge 172 must be moved upwardly whereby the wedge 169 moves downwardly until the wedges 169 and 172 firmly engage against the bracket 145. The slots 148 are much larger than the slots 147 to permit this movement of the bracket 145.

When the roller units 161 are in engagement with the takeup roller 49, further adjustment of the screw 173 results in both the drive roller 48 and the takeup roller 49 being bowed from the central portion toward their fixed outer ends. This is due to the roller units 154 engaging the drive roller 48 and the roller units 161 engaging the takeup roller 49. This produces the desired camber in both the drive roller 48 and the takeup roller 49 to insure that the band 46 properly tracks.

The brackets 149 and 150 have a similar arrangement of a screw 174 (see FIG. 5), an upper wedge 175, and a lower wedge 176 that move the other ends of the rods 152, 153, 159, and 160. It is necessary for the sets of wedges on both sides to be adjusted simultaneously.

As shown in FIG. 6, the plate 141 has a large slot 177 therein. The slot 177 accommodates the screws 173 as it moves upwardly and to the left. The movement to the left is due to the takeup roller 49 being adjustably positioned through the adjustment screws 58 and 59. The horizontal support plate 142 has a similar slot to accommodate the screw 174.

A similar arrangement exists for forming a bow in the drive roller 60 and the takeup roller 61 of the housing 64. Thus, this arrangement is the same as that described for the endless band 46 so it will not be described herein. Accordingly, a camber is formed in both the drive roller 60 and the takeup roller 61 so as to insure that the endless band 47 properly tracks.

In the operation of the holddown apparatus of the present invention, the material 27 is supported on the endless bands 24 and 25 so that one end of the material 27 is initially disposed for engagement by the cutting blade 45. The positioning lock lever 102e is released to permit the shaft 94 to rotate, and the endless bands 46 and 47 may be lowered into contact with the top of the material 27 by manually rotating the hand wheel 116.

The pressure on the cylinder 90 is preferably made sufficiently high to balance the weight of the L-shaped supports 70 and 71 and the structure supported thereby to ease positioning of the endless bands 46 and 47 into engagement with the material 27 by manually turning the hand wheel 116. Then, with the endless bands 46 and 47 in the desired position and the shaft 94 locked against rotation by the positioning lock lever 102e, the output force of the hydraulic cylinder 90 is selected in accordance with the type of material to be cut, the thickness of each layer of the material to be cut, and the total thickness of the material being cut. Accordingly, the desired holddown force is exerted on the material 27 with the endless bands 46 and 47 in engagement with the material 27.

It should be understood that the takeup rollers 49 and 61 have their shafts appropriately positioned by the horizontal adjustment screws 58,59 and 68,69 respectively, to provide the desired tightness of the bands 46 and 47. After the bands 46 and 47 have been tightened through the takeup rollers 49 and 61 being appropriately positioned, the screws 173 and 174 are adjusted to provide the desired camber in the drive roller 48 and the takeup roller 49 for the endless band 46 and screws 178 and 179 (see FIG. 8) are adjusted to provide the desired camber in the drive roller 60 and the takeup roller 61 for the endless band 47.

As shown in FIG. 5, the width of the endless band 46 is the same as the width of the endless band 24 above which it is disposed. Since the bands 24 and 25 have the same width and the bands 46 and 47 have the same width, the band 47 is the same width as the band 25. Therefore, the force exerted on the material 27 is exerted over its entire width since the material 27 will be slightly less than the width of the bands 24, 25, 46, and 47.

While the present invention has been described with the rails 51 and 62 rockably mounted on the L-shaped support 70 and the rails 53 and 63 rockably mounted on the L-shaped support 71, it should be understood that the rails 51 and 52 may be fixedly secured to the L-shaped support 70 by bolts being inserted through passages 180 and 181 (see FIG. 8) in the rails 51 and 62, respectively, and that the rails 53 and 63 may be fixedly secured to the L-shaped support 71 by bolts being inserted through passages 182 and 183 (see FIG. 8) in the rails 53 and 63, respectively. This would be utilized when the material 27 is relatively heavy and would permit the full weight of the housings 52 and 64 to be exerted on the material 27. Of course, rockability is not available when the rails are fixed to the L-shaped supports.

While the holddown structure of this invention has been described as being utilized with the material-cutting machine of the aforesaid Sederberg application, it should be understood that it may be readily employed with any other type of material-cutting machine in which there is relative movement between the material and the cutting means. If the longitudinal movement of the material relative to the cutting means should be of the type shown and described in U.S. Pat. No. 3,262,348 to James G. Wiatt et al. it would be necessary to mount the secondary endless bands 46 and 47 of this invention on the carriage, which moves longitudinally relative to the frame.

An advantage of this invention is that it maintains engagement of the holddown band with the material irrespective of any humps in the material. Another advantage of this invention is that it insures that the holddown bands track properly.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. An apparatus for exerting a predetermined force on material supported on material-supporting means with the material and a cutting blade or the like being movable longitudinally and transversely relative to each other for cutting of the material by the cutting blade, said apparatus including:

a pair of means adapted to engage the material, said pair of means being disposed on opposite sides of the cutting blade in the longitudinal direction of relative movement of the material and the cutting blade;

means to maintain each of said pair of material-engaging means a fixed longitudinal distance from the cutting blade;

means cooperating with said pair of material-engaging means to cause said material-engaging means to exert a predetermined force on the material; and means to rockably support each of said material-engaging means to cause said material-engaging means to rock when an uneven surface of the material engages said material-engaging means to maintain at least a portion of said material-engaging means in engagement with the material to exert the predetermined force thereon.

2. The apparatus according to claim 1 in which:

said pair of material-engaging means comprises:

a pair of endless bands; and means to rotatably mount each of said bands;

said rockably support means supports each of said rotatably mounting means for rocking when said endless band of said rotatably mounting means engages an uneven surface of the material to maintain at least a portion of said endless band in engagement with the material; and means to drive said endless bands in unison in the direction of relative longitudinal movement of the material-supporting means and the cutting blade.

3. The apparatus according to claim 2 in which:

each of said rotatably mounting means includes:

support means;

roller means mounted at each end of said support means; and said endless band passing around said roller means.

4. The apparatus according to claim 3 including means cooperating with each of said roller means to insure that said band remains on said roller means during driving of said band by said drive means.

5. The apparatus according to claim 3 in which:

said roller means comprises a pair of rollers, each of said rollers being rotatably mounted by said support means;

said support means having first and second sets of brackets disposed between said pair of rollers;

means slidably mounting said sets of brackets on said support means;

means to lock said sets of brackets on said support means;

each of said brackets having means adapted to cooperate with the adjacent of said rollers; and means to move said brackets away from each other when said locking means is unlocked, said cooperating means on each of said sets of brackets causing the adjacent of said rollers to be formed with a bowed contour to retain said band thereon.

6. The apparatus according to claim 5 in which:

said cooperating means on each of said sets of brackets comprises:

a roller rotatably mounted on said set of brackets;

a pair of parallel shafts rotatably mounted on said set of brackets between said roller of said cooperating means and said roller of said support means; and means mounted on each of said shafts to transmit force from said bracket moving means to said roller of said support means.

7. The apparatus according to claim 6 in which said means mounted on each of said shafts comprises at least one rotatably mounted member having a circular periphery.

8. An apparatus for exerting a predetermined force on material supported on material-supporting means with the material and a cutting blade or the like being movable longitudinally and transversely relative to each other for cutting of the material by the cutting blade, said apparatus including:

a pair of endless bands adapted to engage the material, said pair of endless bands being disposed on opposite sides of the cutting blade in the longitudinal direction of relative movement of the material and the cutting blade;

means to rotatably mount each of said endless bands including;

support means;

roller means mounted at each end of said support means; and said endless band passing around said roller means;

means to drive said endless bands in unison in the direction of relative longitudinal movement of the material supporting means and the cutting blade;

means cooperating with each of said roller means to insure that said band remains on said roller means during driving of said band by said drive means;

said support means supporting said cooperating means for cooperation with each of said roller means;

said cooperating means including means, separate from said roller means and said endless bands, adjustably supported by said support means to cause each of said roller means to be formed with a bowed contour to retain said band thereon; and means to cause said endless bands to exert a predetermined force on the material.

9. An apparatus for exerting a predetermined force on material supported on material-supporting means with the material and a cutting blade or the like being movable longitudinally and transversely relative to each other for cutting of the material by the cutting blade, said apparatus including:

a pair of endless bands adapted to engage the material, said pair of endless bands being disposed on opposite sides of the cutting blade in the longitudinal direction of relative movement of the material and the cutting blade;

means to rotatably mount each of said endless bands including:

support means;

a pair of rollers, one of said rollers being rotatably mounted at one end of said support means and the other of said rollers being rotatably mounted at the other end of said support means;

said endless band passing around said rollers;

said support means having first and second sets of brackets disposed between said pair of rollers;

means slidably mounting said sets of brackets on said support means;

means to lock said sets of brackets on said support means;

each of said brackets having means adapted to cooperate with the adjacent of said rollers; and means to move said brackets away from each other when said locking means is unlocked, said cooperating means on each of said sets of brackets causing the adjacent of said rollers to be formed with a bowed contour to retain said band thereon;

means to drive said endless bands in unison in the direction of relative longitudinal movement of the material supporting means and the cutting blade; and means to cause said endless bands to exert a predetermined force on the material.

10. The apparatus according to claim 9 in which:

said cooperating means on each of said sets of brackets comprises:

a roller rotatably mounted on said set of brackets;

a pair of parallel shafts rotatably mounted on said set of brackets between said roller of said cooperating means and said roller of said support means; and means mounted on each of said shafts to transmit force from said bracket-moving means to said roller of said support means.

11. The apparatus according to claim 10 in which said means mounted on each of said shafts comprises at least one rotatably mounted member having a circular periphery.

12. A material-cutting machine comprising:

cutting means;

means to support material to be cut by said cutting means;

means to produce relative movement in a longitudinal direction between said material-supporting means and said cutting means to move the material on said material-supporting means relative to said cutting means in a longitudinal direction;

means to produce relative movement in a transverse direction between said cutting means and said material-supporting means in coordination with said longitudinal relative moving means to move the material on said material-supporting means relative to said cutting means in a transverse direction;

means to exert a predetermined force on the material on said material-supporting means adjacent each side of said cutting means; and means to rockably support each of said exerting means to cause said exerting means to rock when an uneven surface of the material engages said exerting means to maintain at least a portion of said exerting means in engagement with the material to exert the predetermined force thereon.

13. The material-cutting machine according to claim 12 in which;

each of said exerting means comprises;

an endless band disposed above said material supporting means; and means to rotatably mount each of said endless bands;

said rockably support means supports each of said rotatably mounting means for rocking when said endless band of said rotatably mounting means engages an uneven surface of the material to maintain at least a portion of said endless band in engagement with the material on said material-supporting means to exert the predetermined force thereon; and means to drive said endless bands at the same velocity as the relative longitudinal velocity between said material-supporting means and said cutting means.

14. The material-cutting machine according to claim 13 including:

stationary support means; and said rockably support means including means slidably mounted on said stationary support means, said slidably mounted means rockably supporting said rotatably mounting means.

15. The material-cutting machine according to claim 14 in which:

said slidably mounted means comprises a support disposed on each side of said endless bands; and said support on one side of said endless bands supporting one side of each of said rotatably mounting means and said support on the other side of said endless bands supporting the other side of each of said rotatably mounting means.

16. The material-cutting machine according to claim 15 including:

means to resiliently support each of said rotatably mounting means on each of said supports; and means to vary the force of said resilient support means.

17. The material-cutting machine according to claim 13 in which:

each of said rotatably mounting means includes;

support means;

a pair of rollers rotatably mounted by said support means; and said endless band passing around said rollers.

UNITED STATES PATENT OFFICE
CERTIFICATE OF CORRECTION

Patent No. 3,575,076    Dated April 13, 1971

Inventor(s) Herman J. Baldwin et al.

It is certified that error appears in the above-identified patent and that said Letters Patent are hereby corrected as shown below:

Title of invention should read -- HOLD DOWN APPARATUS FOR MATERIAL CUTTING MACHINE --.

Col. 1, line 4,  cancel the "hyphen (-)" (both occurrences)

line 38, "holddown" should be---hold down--- line 40, "holddown" should be---hold down--- line 52, "fall" should be---fail---

Col. 2, line 38, cancel the "hyphen (-)"

line 45, cancel the "hyphen (-)"

line 47, cancel the "hyphen (-)"

line 48, cancel the "hyphen (-)"

line 51, cancel the "hyphen (-)"

line 52, cancel the "hyphen (-)"

line 53, cancel the "hyphen (-)"

line 55, cancel the "hyphen (-)"

line 59, cancel the "hyphen (-)"

line 59, after "means" (first occurrence) add---and line 60, cancel the "hyphen (-)"

UNITED STATES PATENT OFFICE
CERTIFICATE OF CORRECTION

Patent No. 3,575,076           Dated April 13, 1971

Inventor(s) Herman J. Baldwin et al.

It is certified that error appears in the above-identified patent and that said Letters Patent are hereby corrected as shown below:

```
                    2
         line 63, cancel the "hyphen (-)"
         line 65, cancel the "hyphen (-)"
         line 67, cancel the "hyphen (-)"
Col. 3,  line 1,  cancel the "hyphen (-)"
         line 2,  "holddown" should be---hold down---
         line 4,  cancel the "hyphen (-)"
         line 7,  cancel the "hyphen (-)"
         line 8,  cancel the "hyphen (-)"
         line 10, cancel the "hyphen (-)"
         line 11, cancel the "hyphen (-)"
         line 12, "holddown" should be---hold down---
         line 15, "holddown" should be---hold down---
         line 16, "holddown" should be---hold down---
         line 20, "holddown" should be---hold down---
         line 23, "holddown" should be---hold down---
         line 24, "holddown" should be---hold down---
         line 27, "holddown" should be---hold down---
         line 33, cancel the "hyphen (-)"
         line 35, "holddown" should be---hold down---
```

UNITED STATES PATENT OFFICE
CERTIFICATE OF CORRECTION

Patent No. 3,575,076          Dated April 13, 1971

Inventor(s)   Herman J. Baldwin et al.

It is certified that error appears in the above-identified patent and that said Letters Patent are hereby corrected as shown below:

Col. 3
            line 37, "holddown" should be---hold down--- line 42, "holddown" should be---hold down---

Col. 4,   line 29, "of" should be---or---

Col. 5,   line 7, cancel the "comma (,)"

line 16, "holddown" should be---hold down--- line 33, "See" should be---see---

Col. 6,   line 60, cancel the "comma (,)" (second occurrence)

Col. 7,   line 16, "counterbalance" should be---counter-balanc line 21, "counterbalance" should be---counter-balanc line 52, "counterbalances" should be---counter-balan
            line 68, cancel the "hyphen (-)"

Col. 8,   line 14, "holddown" should be---hold down--- line 15, "counterbalancing" should be---counterbalancing--- line 23, "holddown" should be---hold down--- line 51, "end" should be--hand---

Col. 9,   line 14, "sideplate" should be---side plate--- line 19, "sideplate" should be---side plate---

UNITED STATES PATENT OFFICE
CERTIFICATE OF CORRECTION

Patent No. 3,575,076          Dated April 13, 1971

Inventor(s)   Herman J. Baldwin et al.

It is certified that error appears in the above-identified patent and that said Letters Patent are hereby corrected as shown below:

Col. 10, line 2, "rollers" should be---roller--- line 32, "hereon" should be---thereon---

Col. 11, line 41, "holddown" should be---hold down--- line 60, "holddown" should be---hold down--- line 65, after "69" insert a---comma (,)---

Col. 12, line 22, "holddown" should be---hold down--- line 23, cancel the "hyphen (-)"

line 26, cancel the "hyphen (-)"

line 30, after "al." insert a---comma (,)--- line 35, "holddown" should be---hold down--- line 37, "holddown" should be---hold down---

IN THE CLAIMS

Col. 12, line 48, cancel the "hyphen (-)"

line 57, cancel the "hyphen (-)"

line 60, cancel the "hyphen (-)"

line 61, cancel the "hyphen (-)"

line 63, cancel the "hyphen (-)"

line 64, cancel the "hyphen (-)"

line 66, cancel the "hyphen (-)"

line 67, cancel the "hyphen (-)"

line 70, cancel the "hyphen (-)"

FORM PO-1050 (10-69)

UNITED STATES PATENT OFFICE
CERTIFICATE OF CORRECTION

Patent No. 3,575,076            Dated April 13, 1971

Inventor(s)    Herman J. Baldwin et al.

It is certified that error appears in the above-identified patent and that said Letters Patent are hereby corrected as shown below:

Col. 13, line 4, cancel the "hyphen (-)"

line 46, cancel the "hyphen (-)"

line 56, the "semi-colon (;)" should be a ---colon (:)---

Col. 14, line 2, cancel the "hyphen (-)"

line 45, cancel the "hyphen (-)"

line 50, cancel the "hyphen (-)"

line 54, cancel the "hyphen (-)"

line 55, cancel the "hyphen (-)"

line 59, cancel the "hyphen (-)"

line 62, cancel the "hyphen (-)"

line 65, cancel the "hyphen (-)"

line 73, cancel the "hyphen (-)"

line 74, the "semi-colon (;)" should be a ---colon (:)---

UNITED STATES PATENT OFFICE
CERTIFICATE OF CORRECTION

Patent No. 3,575,076     Dated   April 13, 1971

Inventor(s)   Herman J. Baldwin et al.

It is certified that error appears in the above-identified patent and that said Letters Patent are hereby corrected as shown below:

Col. 6, line 75, the "semi-colon (;)" should be a ---colon (:)---

Col. 15, line 9, cancel the "hyphen (-)"

line 12, cancel the "hyphen (-)"

line 14, cancel the "hyphen (-)"

line 21, cancel the "hyphen (-)"

Col. 16, line 9, cancel the "hyphen (-)"

line 14, cancel the "hyphen (-)"

line 16, the "semi-colon (;)" should be a ---colon (:)---

Signed and sealed this 16th day of May 1972.

(SEAL)
Attest:

EDWARD M. FLETCHER, JR.
Attesting Officer

ROBERT GOTTSCHALK
Commissioner of Patents